United States Patent
Sen et al.

(10) Patent No.: US 11,277,649 B2
(45) Date of Patent: Mar. 15, 2022

(54) CHUNK-BASED FILTERING TO OPTIMIZE VIDEO STREAMING QUALITY AND DATA USAGE

(71) Applicant: AT&T Intellectual Property I, L.P., Atlanta, GA (US)

(72) Inventors: Subhabrata Sen, Westfield, NJ (US); Shuai Hao, Hillsborough, NJ (US); Yanyuan Qin, Tolland, CT (US); Bing Wang, Storrs Mansfield, CT (US); Krishna R. Pattipati, Storrs, CT (US)

(73) Assignees: AT&T INTELLECTUAL PROPERTY I. L.P., Atlanta, GA (US); THE UNIVERSITY OF CONNECTICUT, Farmington, CT (US)

( * ) Notice: Subject to any disclaimer, the term of this patent is extended or adjusted under 35 U.S.C. 154(b) by 0 days.

(21) Appl. No.: 16/560,721

(22) Filed: Sep. 4, 2019

(65) Prior Publication Data
US 2021/0067819 A1    Mar. 4, 2021

(51) Int. Cl.
*H04N 21/234* (2011.01)
*H04L 29/06* (2006.01)
(Continued)

(52) U.S. Cl.
CPC ..... *H04N 21/23418* (2013.01); *H04L 65/607* (2013.01); *H04N 21/231* (2013.01);
(Continued)

(58) Field of Classification Search
CPC ........... H04N 21/23418; H04N 21/231; H04N 21/2662; H04N 21/643; H04N 21/8456;
(Continued)

(56) References Cited

U.S. PATENT DOCUMENTS 10,546,011 B1 * 1/2020 Dunham ............. G10L 15/1822
2008/0301749 A1 * 12/2008 Harrar ................ H04N 21/4882
725/131
(Continued)

OTHER PUBLICATIONS

Qin, Yanyuan et al., "Quality-aware Strategies for Optimizing ABR Video Streaming Qo-E and Reducing Data Usage", In 10th ACM Multi-media Systems Conference (MMSys '19) Jun. 18-21, 2019, Amherst, MA, USA, 12 pages.

*Primary Examiner* — Alexander Gee (57) ABSTRACT

A processing system including at least one processor may obtain a selection of a desired perceptual quality for a video and selects a first video chunk from among a first plurality of video chunks, wherein the first plurality of video chunks is associated with a first time block of the video, wherein the selecting is based upon a manifest file of the video, wherein each video chunk of the first plurality of video chunks is associated with a respective perceptual quality and a respective encoding bitrate, wherein the first video chunk is part of a subset of the first plurality of video chunks for which the respective perceptual quality matches the desired perceptual quality within a predefined threshold tolerance, and wherein the respective encoding bitrate of the first video chunk is lower than a highest encoding bitrate associated with the (Continued)

subset of the first plurality of video chunks. The processing system may obtain the first video chunk from a server and store the first video chunk in a buffer.

20 Claims, 4 Drawing Sheets

(51) Int. Cl.

| | | |
|---|---|---|
| *H04N 21/231* | (2011.01) | |
| *H04N 21/236* | (2011.01) | |
| *H04N 21/24* | (2011.01) | |
| *H04N 21/2662* | (2011.01) | |
| *H04N 21/643* | (2011.01) | |
| *H04N 21/258* | (2011.01) | |
| *H04N 21/845* | (2011.01) | |
| *H04N 21/262* | (2011.01) | |
| *H04L 65/60* | (2022.01) | |
| *H04L 65/65* | (2022.01) | |

(52) U.S. Cl.
CPC ....... *H04N 21/236* (2013.01); *H04N 21/2402* (2013.01); *H04N 21/2662* (2013.01); *H04L 65/608* (2013.01); *H04N 21/643* (2013.01)

(58) Field of Classification Search
CPC ......... H04N 21/26606; H04N 21/4307; H04N 21/4325; H04N 21/4623; H04N 21/812; H04N 21/8133; H04N 21/8402; H04N 21/23; H04N 21/232; H04N 21/2323; H04N 21/235; H04N 21/2353; H04N 21/236; H04N 21/238; H04N 21/242; H04N 21/43; H04N 21/4302; H04N 21/4305; H04N 21/4621; H04N 21/23439; H04N 21/435; H04N 21/47202; H04N 7/165; H04L 67/06
See application file for complete search history.

(56) References Cited

U.S. PATENT DOCUMENTS

| | | | |
|---|---|---|---|
| 2009/0300204 A1* | 12/2009 | Zhang | H04N 21/6373 709/231 |
| 2010/0161384 A1* | 6/2010 | Wells | G06Q 30/00 705/59 |
| 2012/0124179 A1* | 5/2012 | Cappio | H04L 67/2823 709/219 |
| 2013/0279521 A1* | 10/2013 | Perez Martinez | H04L 41/5029 370/468 |
| 2016/0294898 A1* | 10/2016 | Wheelock | H04L 65/602 |
| 2016/0337680 A1* | 11/2016 | Kalagi | H04L 65/602 |
| 2017/0180825 A1* | 6/2017 | Lacivita | H04N 21/8133 |
| 2017/0289639 A1* | 10/2017 | Reisner | H04N 21/812 |
| 2018/0035137 A1* | 2/2018 | Chen | H04N 21/2743 |
| 2018/0160161 A1* | 6/2018 | Reznik | H04N 21/8456 |
| 2018/0160192 A1* | 6/2018 | Wu | H04N 21/4856 |
| 2018/0181266 A1* | 6/2018 | von Muhlen | G06F 16/1774 |
| 2018/0192080 A1* | 7/2018 | Henaire | H04N 21/2353 |
| 2018/0262813 A1* | 9/2018 | Moorthy | H04N 21/2401 |
| 2019/0028529 A1* | 1/2019 | Katsavounidis | H04N 19/132 |
| 2019/0069039 A1* | 2/2019 | Phillips | H04N 21/6587 |
| 2020/0204759 A1* | 6/2020 | Liu | H04N 19/154 |

* cited by examiner

CHUNK-BASED FILTERING TO OPTIMIZE VIDEO STREAMING QUALITY AND DATA USAGE

The present disclosure relates generally to adaptive video streaming, and relates more particularly to devices, non-transitory computer-readable media, and methods for selecting a video chunk from among a plurality of video chunks associated with a first time block of a video in accordance with a desired perceptual quality.

BACKGROUND

Video delivery technology has shifted from legacy protocols, such as Real Time Messaging Protocol (RTMP) and Real Time Streaming Protocol (RTSP) to Hypertext Transfer Protocol (HTTP)-based, adaptive streaming protocols, such as Moving Picture Experts Group (MPEG) Dynamic Adaptive Streaming over HTTP (DASH). A common feature of HTTP-based adaptive streaming protocols is the availability of video in multiple chunks associated with each time block of a video and having different encoding bitrates, with the chunks linked together by a manifest file, or "index file" (also referred to as a "media presentation description" (MPD) in DASH) that defines all of the variants/tracks (e.g., respective sets of chunks, each set at a different bitrate/encoding level) of the video.

SUMMARY

Examples of the present disclosure include a method, apparatus, and non-transitory computer-readable storage medium for selecting a video chunk from among a first plurality of video chunks associated with a first time block of a video in accordance with a desired perceptual quality. In one example, a processing system including at least one processor may obtain a selection of a desired perceptual quality for a video and selects a first video chunk from among a first plurality of video chunks, wherein the first plurality of video chunks is associated with a first time block of the video, wherein the selecting is based upon a manifest file of the video, wherein each video chunk of the first plurality of video chunks is associated with a respective perceptual quality and a respective encoding bitrate, wherein the first video chunk is part of a subset of the first plurality of video chunks for which the respective perceptual quality matches the desired perceptual quality within a predefined threshold tolerance, and wherein the respective encoding bitrate of the first video chunk is lower than a highest encoding bitrate associated with the subset of the first plurality of video chunks. The processing system may obtain the first video chunk from a server and store the first video chunk in a buffer.

In another example, a device includes a processing system including at least one processor and a computer-readable medium storing instructions which, when executed by the processing system, cause the processing system to perform operations. The operations include obtaining a selection of a desired perceptual quality for a video, selecting, by the processing system, a first video chunk from among a first plurality of video chunks, wherein the first plurality of video chunks is associated with a first time block of the video, wherein the selecting is based upon a manifest file of the video, wherein each video chunk of the first plurality of video chunks is associated with a respective perceptual quality and a respective encoding bitrate, wherein the first video chunk is part of a subset of the first plurality of video chunks for which the respective perceptual quality matches the desired perceptual quality within a predefined threshold tolerance, and wherein the respective encoding bitrate of the first video chunk is lower than a highest encoding bitrate associated with the subset of the first plurality of video chunks, obtaining the first video chunk from a server, and storing the first video chunk in a buffer.

In yet another example, a method performed by a processing system including at least one processor includes obtaining a selection of a desired perceptual visual quality for a video, filtering a manifest file of the video, wherein the manifest file includes information for a plurality of video chunks associated with a first time block of the video, wherein each video chunk of the plurality of video chunks is associated with a respective perceptual quality and a respective encoding bitrate and wherein the filtering comprises removing from the manifest file information associated with a first subset of the plurality of video chunks for which the respective perceptual quality is greater than the desired perceptual visual quality, and sending, by the processing system, the manifest file to a user endpoint device, subsequent to the filtering.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes a device, computer-readable medium, and method for selecting a video chunk from among a plurality of video chunks associated with a first time block of a video in accordance with a desired perceptual quality. As discussed above, a common feature of HTTP-based adaptive streaming protocols is the availability of video in multiple chunks associated with each time block of a video and having different encoding bitrates, with the chunks linked together by a manifest file, or "index file" that defines all of the variants/tracks (e.g., respective sets of chunks, each set at a different bitrate/encoding level) of the video.

A video chunk (broadly a "chunk") may comprise a sequence of video and/or audio frames for a time block of a video that is encoded at a particular bitrate (e.g., a target bitrate, or "encoding level"). In one example, a chunk may be referred to as a segment, when the chunks of an adaptive bitrate (ABR) video are stored as individual data files separate from other chunks. In such an example, the chunk (e.g., a segment) may be obtained by a requesting device, such as a player device, via a uniform resource locator (URL) identifying a file containing the chunk. In another example, a chunk may be stored and/or made available as a portion of a file which may contain multiple chunks or even an entire variant/track. In this case, the chunk may be referred to as a "fragment." In addition, such a chunk (e.g., a fragment) may be obtained via a URL identifying the file containing the chunk and a byte range, timestamp, index, sequence number, or the like to distinguish the chunk from other chunks in the same file. The URL(s) and other information that may be used by a player device to request and obtain chunks of an adaptive bitrate video may be stored in a manifest file which may be obtained by the player device in advance of a streaming session.

For a time block of an ABR video, there may be multiple associated chunks at respective bitrates. In particular, each of these associated chunks may be of a respective variant for the video. In addition, each variant may comprise a set of chunks encoded at a same bitrate (e.g., a target bitrate) and covering successive time blocks so as to constitute a complete copy of the video at the (target) bitrate for that variant. The time blocks may have a duration that is defined in advance in accordance with an adaptive bitrate protocol and/or set according to a preference of a video player vendor, a video service provider, a network operator, a video creator, a transcoder vendor, and so forth. In one example, chunks may be associated with particular time blocks of a video via sequence numbers, index numbers/indices, or the like which indicate a relative (temporal) order of the time blocks within the overall video. For instance, time block indicators for each available chunk may be included in the manifest file so that a player device may determine which chunks may be requested for each time block and so that the player device may determine which chunk(s) to request next (e.g., for successive time blocks).

A variety of factors may affect a user's quality of experience (QoE) for video streaming. These include video stalls, startup delay, and poor video/audio quality. ABR streaming over HTTP is widely adopted since it offers significant advantages in terms of both user-perceived quality and resource utilization for content and network service providers. Unlike video downloads that must complete fully before playback can begin, streaming video starts playing within seconds. With ABR-based streaming, each video is encoded at a number of different rates (called variants) and stored on servers as separate files. A video client running on a mobile device, home television, game console, web browser, or the like may choose which video rate to stream by monitoring network conditions and estimating the available network capacity.

In ABR encoding schemes for ABR streaming, for each time block of a video, the encoding bitrates for video chunks, and hence the picture quality, generally increase from lower bitrate to higher bitrate tracks. During playback, the client/video player downloads a manifest file containing metadata about the different tracks (and the video chunks of each track) and resource requirements (e.g., peak rate). The ABR logic at the video player dynamically determines which chunk (i.e., from which track) to fetch for each position/time block in the video, which may be based on available network bandwidth and other factors.

The function of the ABR algorithm is to select ABR tracks (called representations in DASH) in real time to maximize video quality and minimize re-buffering events. For example, a video client maintains a media cache (also referred to as a "buffer" or "video buffer"), by pre-fetching video chunks; then playback occurs from the cache. For each time block of a video-on-demand (VoD) program/live channel, the video client selects which track (chunk) of that time block to download into the cache. Higher quality chunks for a given time block are larger in size (data volume) and take longer to download than lower quality chunks. In general, the goal is to download the highest possible quality chunk each time, while preventing the buffer from becoming empty.

One approach to track or chunk selection is channel capacity estimation, which uses chunk download time as an estimate of available channel bitrate. The video client selects a chunk of a track having a bitrate/encoding level that most closely matches the channel bitrate without exceeding it. In an environment where throughput is highly variable, such as a mobile network, accurate estimation of future channel capacity is challenging.

Another approach uses a current buffer level (e.g., a measure of an amount of time of video stored in the buffer to be played out), instead of estimated channel bandwidth, to select the bitrate/encoding level of the next chunk. As with capacity estimation, the objective is to balance the flow of data into the buffer with the outflow, i.e., to keep the buffer from either emptying or overflowing. Unlike with channel capacity estimation, for buffer occupancy-based approach, the actual buffer level is used to select the next chunk, e.g., with a linear, or approximately linear, mapping function. The higher the current buffer level, the higher the bitrate selected for the next chunk for the next time block, and vice versa: the lower the buffer level, the lower the track bitrate selected. This ensures conservative behavior, e.g., selecting minimum quality/chunk size, when the buffer is low, i.e., filling the buffer more quickly using a chunk of a lower track, and aggressive behavior, e.g., selecting maximum quality/chunk size, when the buffer is full or nearly so, i.e., filling the buffer more slowly using a chunk of a higher track.

Streaming videos over cellular networks is challenging due to highly dynamic network conditions. While ABR video streaming strategies focus on maximizing the QoE, opportunities to reduce the associated data usage may be overlooked. Since mobile data is a relatively scarce resource and video streaming tends to be data-intensive (e.g., the average data plan for a mobile customer in the United States provides about 2.5 GB of data per month, whereas streaming even one hour of video may consume as much as 3 GB), some video and network providers offer options for users to exercise control over the amount of data consumed by video streaming. However existing data saving practices for ABR videos may lead to highly variable video quality delivery and do not make the most effective use of network data. Moreover, existing approaches to ABR rate adaptation focus largely on improving the QoE from the user perspective, and do not explicitly consider data efficiency as a major factor in selecting tracks.

Existing ABR schemes also do not have access to or do not consider video encoding/perceptual quality (e.g., the visual quality of the video as perceived by the human eye) information. Adaptation decisions to improve QoE are largely track-based, making a coarse-grained assumption that a higher bitrate track has better visual quality than a lower bitrate track. This fails to account for the existence of significant visual quality variability across chunks and different scenes even within the same track. In addition, existing ABR schemes focus on maximizing the video quality and user QoE, and do not directly attempt to optimize data usage. While some implementations do result in limitations of data usage, such behaviors are driven primarily by QoE impairment concerns. For example, the network bandwidth estimation at the client/video player may not be accurate. Thus, selecting the highest bitrate tracks can increase the chance of stalls. To address this, one ABR scheme may consider only tracks with declared bitrates (e.g., for a given track, set around the peak bitrate of that track) that are at least 25% lower than the estimated network bandwidth. While such a configuration impacts data usage, data efficiency is not a primary factor in making the track selection decision. In addition, as mentioned above, some mobile network operators and commercial video services provide users with certain "data saver" options (which may be track-based, e.g., limit the highest quality/screen resolution/bitrate track, or network-bandwidth-based, e.g., restrict the available network-bandwidth at the direction of the client device/video player).

It is observed that for encoders that are in wide use (e.g., H.264 and H.265 encoders, VP9 encoders, AV1 (AOMedia Video 1) format encoders, etc.), the perceptual quality exhibits significant variability across different chunks within the same track, for both constant bitrate (CBR) and variable bitrate (VBR) encodings. In other words, even for two video chunks that are encoded at the same bitrate, the perceptual quality may vary greatly due to other factors like scene complexity (e.g., amount of spatial and/or temporal information contained in a scene), compression scheme, and the like. For instance, the perceptual quality of a complex action scene (e.g., a medium or long shot scene of a high-speed car chase) encoded at a first bitrate may be lower than the perceptual quality of a simpler character scene (e.g., a close-up scene of a single person presenting a monologue) that is also encoded at the first bitrate. Thus, there can be a significant variation in the perceptual quality of chunks across the same variant.

Therefore, a data-saving approach that removes the highest bitrate tracks may inevitably lead to quality variations. For instance, a simple scene may be streamed and played-out at an unnecessarily high quality, while a complex scene may be streamed and played out at a much lower quality. Such perceptual quality variability impairs users' QoE, and makes suboptimal use of network data. It is also observed that diminishing returns are achieved with increasing encoding bitrates; as bitrate increases, perceptual quality improvements become progressively smaller.

In one example of the present disclosure, every chunk of every track of a video may be assigned a perceptual quality level. The perceptual quality level may be defined in a number of ways, for instance as a selection on a scale of selections (e.g., low/medium/high, on a scale from one to ten, using a slider bar, etc.). A user who wishes to view the video may then select a desired perceptual quality level, and every chunk that matches the user-selected perceptual quality level may be identified. Since perceptual quality is influenced by many factors not including encoding bitrate, this may mean that for any given time block in the video, there may be multiple chunks that correspond to the user-selected perceptual quality level, where each chunk of the multiple chunks is encoded at a different bitrate (i.e., is part of a different track). From the multiple chunks for the time block, the chunk with the lowest encoding bitrate may be selected for download to the user's media player. By selecting chunks in this manner each time a new chunk is to be downloaded, the perceptual quality of the video can be maintained at a relatively consistent level while making efficient use of data. In other examples, the selected chunk may not have the lowest encoding bitrate among the multiple chunks, but may have an encoding bitrate that is lower than the highest encoding bitrate among the chunks. Put another way, the selected chunk may have an encoding bitrate that is somewhere between the lowest encoding bitrate and the highest encoding bitrate among the multiple chunks.

Put another way, this approach can avoid wasting data by downloading chunks that are of a higher encoding bitrate (and therefore take longer to download and consume greater buffer space) than is necessary to meet the user's expectations. For instance, when downloading a scene of relatively low complexity, the chunk with the lowest encoding bitrate that still meets the user-selected perceptual quality level may be chosen. This may free up data that can later be used to download a chunk with a higher encoding bitrate for a complex action scene.

In this regard it should be noted that examples of the present disclosure may implement an adaptive video streaming system in which a video server may provide a manifest file for a video to a client/video player in which the manifest file indicates a plurality of video chunks associated with each time block of the video as well as perceptual visual qualities of the plurality of video chunks associated with each time block of the video. In one example, the plurality of video chunks for each time block of the video may be of different tracks. In other words, the adaptive video streaming may be adaptive bitrate (ABR) streaming, where each video is comprised of different tracks, each track encoded in accordance with a target or nominal encoding bitrate. In this case, the manifest file may indicate the track to which each of the plurality of video chunks of each time block belongs. In addition, the manifest file may indicate for each video chunk: a URL or other indicators of where and/or how the client/video player may obtain the chunk, the data size/volume of the chunk, the playback duration of the chunk, and so forth. However, examples of the present disclosure are not limited to track-based ABR streaming. For instance, each time block of a video program may be associated with multiple video chunks, each with a different perceptual visual quality, while the chunks of the same or similar encoding bitrates for successive time blocks of the video may not be organized into "tracks" per se.

In one example, the perceptual quality of each video chunk associated with a time block of a video may be determined, and the perceptual quality may then be stored as metadata along with the respective video chunk, e.g., at one or more network-based servers of a streaming video service. To illustrate, a network-based server may apply an automated evaluation metric to determine a quantitative score, or perceptual quality for each video chunk. For instance, the perceptual quality may be calculated/assigned in accordance with one or more quality measures, such as a peak signal-to-noise ratio (PSNR), a Video Multi-method Assessment Fusion (VMAF), a structural similarity (SSIM) index, or the like, which may evaluate each chunk in an automated manner and assign a numeric score of perceptual quality on a given scale. The perceptual quality may also be calculated/assigned in accordance with one or more different statistical measures (e.g., mean, median, percentiles, etc.) for individual video frames within a video chunk (e.g., median PSNR of all frames in the video chunk). When each video chunk is identified to a client/video player in a manifest file, the associated perceptual quality for the video chunk may therefore be included as additional information.

According to examples of the present disclosure, a user may inform a video server of a user-selected desired perceptual quality, which may be measured by robust perceptual video/image quality metrics such as video multi-method assessment fusion (VMAF). For every time block in the video, chunk-based filtering (CBF) may limit the choice of the lowest quality video chunk to the video chunk whose perceptual quality is nearest to the user-selected desired perceptual quality. As such, the client/video player may work with a set of more desirable choices of video chunks for each time block of a video (both from quality and bandwidth usage perspectives), which may thereby help the client/video player to achieve improved streaming performance. For instance, the lowest quality (e.g., lowest encoding bitrate) video chunk with the desired perceptual quality may be selected for download and playback. In addition, in various examples, the present disclosure may also be used in conjunction with other data saving techniques, such as network-based bandwidth limitation techniques, track-based limitations, and so forth.

From a practical perspective, a key advantage of the chunk-based filtering (CBF) approach disclosed herein is that the approach can be incrementally deployed in existing streaming pipelines, such as DASH and HLS pipelines, at either the server side or the client side. In both deployment scenarios (i.e., client side and server side), no chunks need be removed from the server's storage. Instead, the manifest file that is transmitted by the server to the client may be modified or extended in a manner that allows the client to select the optimal video chunk for each time block of video.

On the server side, CBF may be deployed in at least two ways. In one example, referred to herein as "chunk variant trimming," the server may modify the manifest file so that, for each time block of the video, the manifest file lists only the chunk variants that remain after chunk-based filtering. For instance, for a given time block, only the x lowest bitrate variants may be listed in the manifest file. From the client perspective, it appears as if the higher bitrate variants (which remain stored on the server) simply do not exist.

In another example, herein referred to as "chunk variant substitution," one or more variants may be filtered out according to CBF as discussed above. However, instead of removing the filtered out variants from the manifest file, the information for the filtered out variants may instead be replaced with the information for a variant that was not filtered out (e.g., the lowest bitrate variant that was not filtered out). By replacing the information for the filtered out variants rather than removing the filtered out variants, it is less apparent to the client that the manifest file has been changed, since the manifest file will still list the expected number of variants for the time block.

It has been experimentally shown that both chunk variant trimming and chunk variant substitution work with the DASH and HLS protocols, as well as common packaging formats such as fragmented MP4 and MPEG-2 TS. Chunk variant substitution works when the media format does not include separate initialization segments (i.e., each chunk is self-initializing), and can also be implemented for media formats where separate initialization segments (each segment containing information required to initialize the video decoder to decide a particular chunk) are included, providing that a proper initialization segment is specified for each chunk of the manifest file.

In another example, when CBF is deployed at the client side, the manifest file sent by the server to the client will include the perceptual quality information for each chunk. In this case, when the client makes a rate adaptation decision for a given time block, the client will exclude from consideration the variants whose perceptual quality levels are above the user's desired perceptual quality level. Although a chunk's perceptual quality metrics may be transmitted in the chunk itself (e.g., according to the isolated recordings, or ISO, standard), for rate adaptation purposes, it is more helpful if the client has access to the perceptual quality information before downloading the chunk, so that the perceptual quality information can be taken into account when selecting the optimal variant.

CBF as discussed above can be used in conjunction with any existing ABR scheme. Even those these ABR schemes are not inherently "quality aware," CBF can be used to filter out chunk variants based on quality. Thus, the output of a CBF operation can be used as the input into any existing ABR scheme. Incorporation of CBF may improve the performance of an existing ABR scheme by helping the existing ABR scheme conserve data and achieve consistent quality.

It should also be noted that although examples of the present disclosure are described primarily in connection with a video client and video streaming, examples of the present disclosure may be similarly applied to other types of streaming media, such as adaptive bitrate streaming audio. In addition, aspects of the present disclosure are equally applicable to live video streaming and on-demand streaming of recorded video programs, as well as to both CBR and VBR encoding of video chunks. Similarly, although aspects of the present disclosure may be focused upon streaming via cellular networks, the present disclosure is also applicable to other types of networks and network infrastructure, including wired or wireless networks (e.g., home broadband), and so forth. These and other aspects of the present disclosure are described in greater detail below in connection with the examples of FIGS. 1-4.

Figure 1:
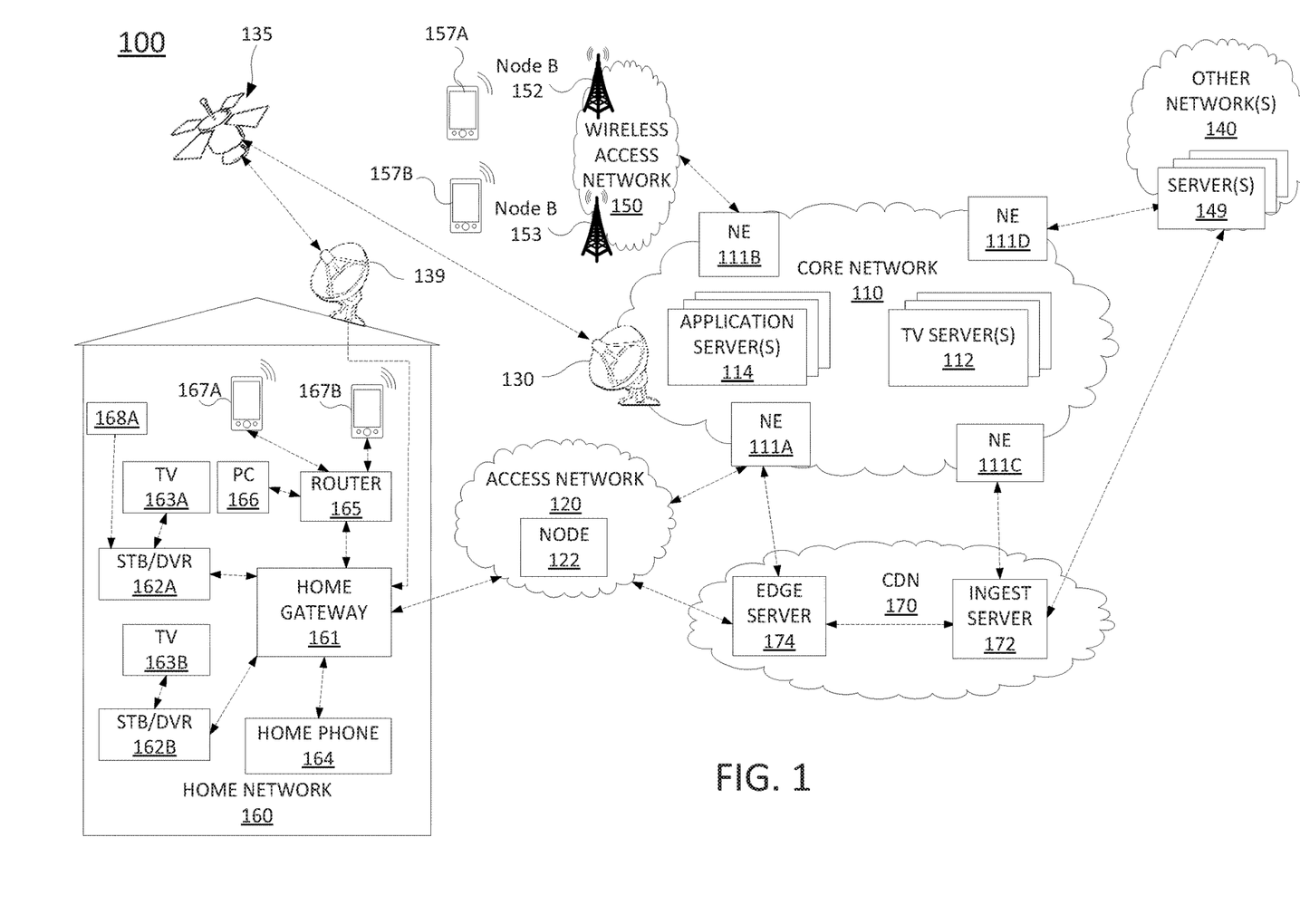
FIG. 1 illustrates an example network related to the present disclosure.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140, content distribution network (CDN) 170, and/or the Internet in general. For instance, connections between core network 110, access network 120, home network 160, CDN 170, wireless access network 150 and other networks 140 may comprise the Internet in general, internal links under the control of single telecommunication service provider network, links between peer networks, and so forth.

In one example, wireless access network 150 may comprise a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G) or any other yet to be developed future wireless/cellular network technology. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB). In one example, wireless access network 150 may be controlled and/or operated by the same entity as core network 110.

In one example, each of the mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, any one or more of the mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, wireless access network 150, access network 120, and so forth. As shown in FIG. 1, core network 110 may also include a plurality of television (TV) servers 112, and a plurality of application servers 114. For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may include content server(s) to store scheduled television broadcast content for a number of television channels, video-on-demand (VoD) programming, local programming content, and so forth. Alternatively, or in addition, content providers may stream various contents to the core network 110 for distribution to various subscribers, e.g., for live content, such as news programming, sporting events, and the like. Television servers 112 may also include advertising server(s) to store a number of advertisements that can be selected for presentation to viewers, e.g., in the home network 160 and at other downstream viewing locations. For example, advertisers may upload various advertising content to the core network 110 to be distributed to various viewers. Television servers 112 may also include interactive TV/video-on-demand (VoD) server(s) and/or network-based digital video recorder (DVR) servers, as described in greater detail below.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other types of television service to subscribers via access network 120. In this regard, access network 120 may include a node 122, e.g., a mini-fiber node (MFN), a video-ready access device (VRAD) or the like. However, in another example, node 122 may be omitted, e.g., for fiber-to-the-premises (FTTP) installations. Access network 120 may also transmit and receive communications between home network 160 and core network 110 relating to voice telephone calls, communications with web servers via other networks 140, content distribution network (CDN) 170 and/or the Internet in general, and so forth. In another example, access network 120 may be operated by a different entity from core network 110, e.g., an Internet service provider (ISP) network.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

As illustrated in FIG. 1, core network 110 may include various application servers 114. For instance, application servers 114 may be implemented to provide certain functions or features, e.g., a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like.

In one example, application servers 114 may include data storage servers to receive and store manifest files regarding chunk-based multi-encoded videos (e.g., track-based or non-track-based multi-bitrate encoded videos for adaptive video streaming, adaptive bitrate video streaming, etc. and/or videos that are represented, e.g., for a given video, as multiple video chunks encoded at multiple perceptual quality levels for each time block of the video), maintained within TV servers 112 and/or available to subscribers of core network 110 and stored in server(s) 149 in other networks 140. It should be noted that the foregoing are only several examples of the types of relevant application servers 114 that may be included in core network 110 for storing information relevant to providing various services to subscribers.

In accordance with the present disclosure, other networks 140 and servers 149 may comprise networks and devices of various content providers of chunk-based multi-encoded videos. In one example, each of the servers 149 may also make available manifest files which describe the variants of a video and the segments/video chunks thereof which are stored on the respective one of the servers 149. For instance, there may be several video chunks containing video and audio for the same time block (e.g., a portion of 2-10 seconds) of the video, but which are encoded at different bitrates in accordance with an adaptive bitrate streaming protocol and/or which have different perceptual qualities. Thus, a streaming video player (e.g., an ABR streaming video player, and/or a video player that may be configured to provide QUAD streaming as described herein) may request and obtain any one of the different video chunks for the time block, e.g., in accordance with QUAD streaming logic and depending upon a user-selected desired perceptual quality, depending upon the perceptual qualities of available video chunks for the time block, depending upon a state of a video buffer, depending upon network bandwidth or other network conditions, depending upon the access rights of the streaming video player to different variants (e.g., to different encoding levels/bitrates) according to a subscription plan and/or for the particular video, and so forth.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

Figure 2:
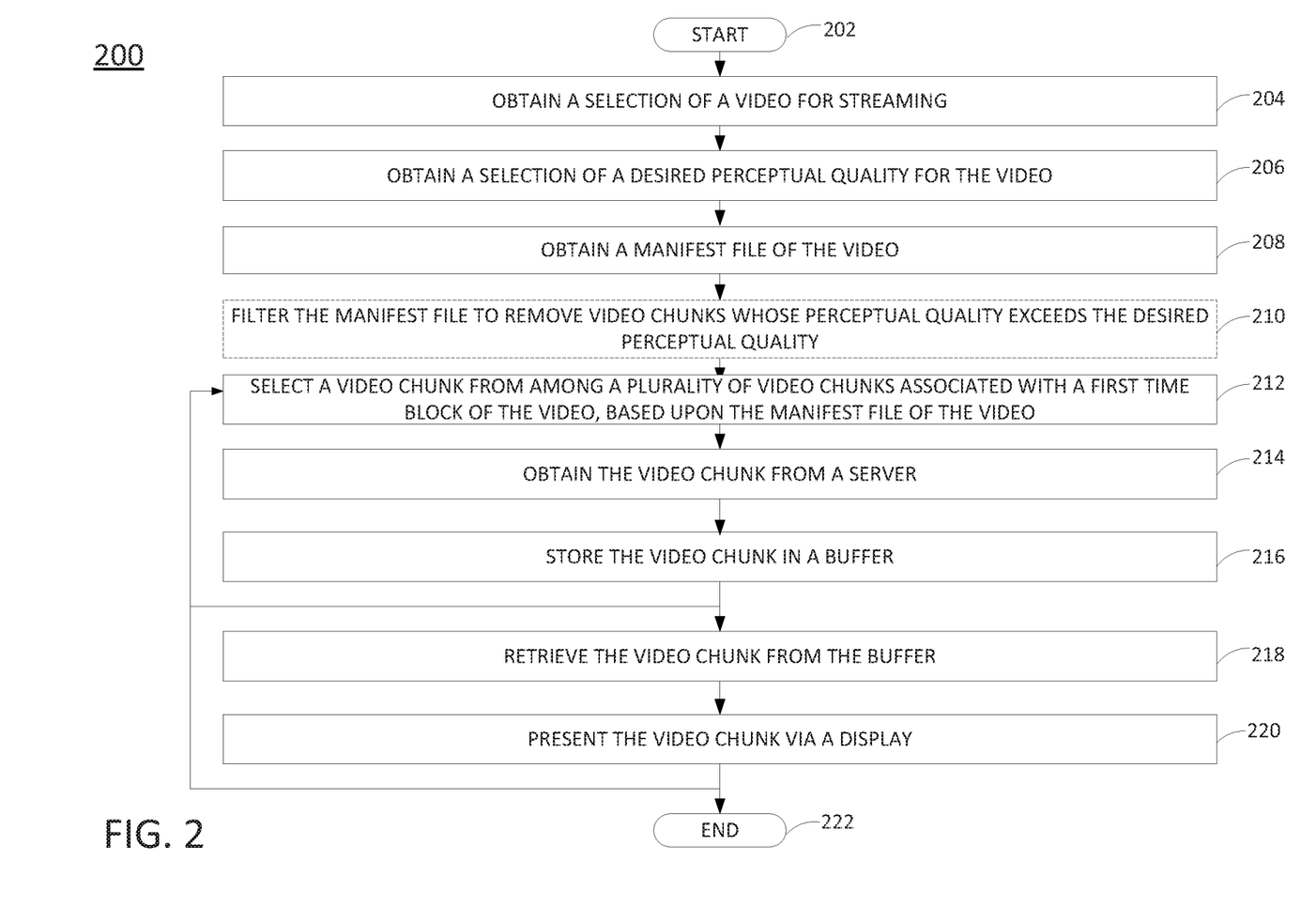
FIG. 2 illustrates a flowchart of an example method for selecting a video chunk from among a plurality of video chunks associated with a first time block of a video in accordance with a desired perceptual quality.

In one example, one or both of the STB/DVR 162A and STB/DVR 162B may comprise all or a portion of a computing device or system, such as computing system 400, and/or processing system 402 as described in connection with FIG. 4 below, specifically configured to perform various steps, functions, and/or operations for selecting a video chunk from among a plurality of video chunks associated with a first time block of a video in accordance with a designated perceptual quality (e.g., a user-selected desired perceptual quality). Among other functions, STB/DVR 162A and STB/DVR 162B may comprise streaming video players capable of streaming and playing multi-encoded videos in formats such as H.264 (Advanced Video Coding (AVC)), H.265 (High Efficiency Video Coding (HEVC)), Moving Picture Expert Group (MPEG) .mpeg files, .mov files, .mp4 files, 0.3gp files, .f4f files, .m3u8 files, or the like. A flowchart of an example method of selecting a video chunk from among a plurality of video chunks associated with a first time block of a video in accordance with a designated perceptual quality is illustrated in FIG. 2 and described in greater detail below. Although STB/DVR 162A and STB/DVR 162B are illustrated and described as integrated devices with both STB and DVR functions, in other, further, and different examples, STB/DVR 162A and/or STB/DVR 162B may comprise separate STB and DVR devices.

It should be noted that in one example, another device may provide one or more operations or functions for selecting a video chunk from among a plurality of video chunks associated with a first time block of a video in accordance with a designated perceptual quality, as described herein. For instance, one or more of mobile devices 157A, 157B, 167A and 167B, and/or PC 166 may also comprise all or a portion of a computing device or system, such as computing system 400, and/or processing system 402 as described in connection with FIG. 4 below, specifically configured to perform various steps, functions, and/or operations for selecting a video chunk from among a plurality of video chunks associated with a first time block of a video in accordance with a designated perceptual quality, as described herein.

Figure 3:
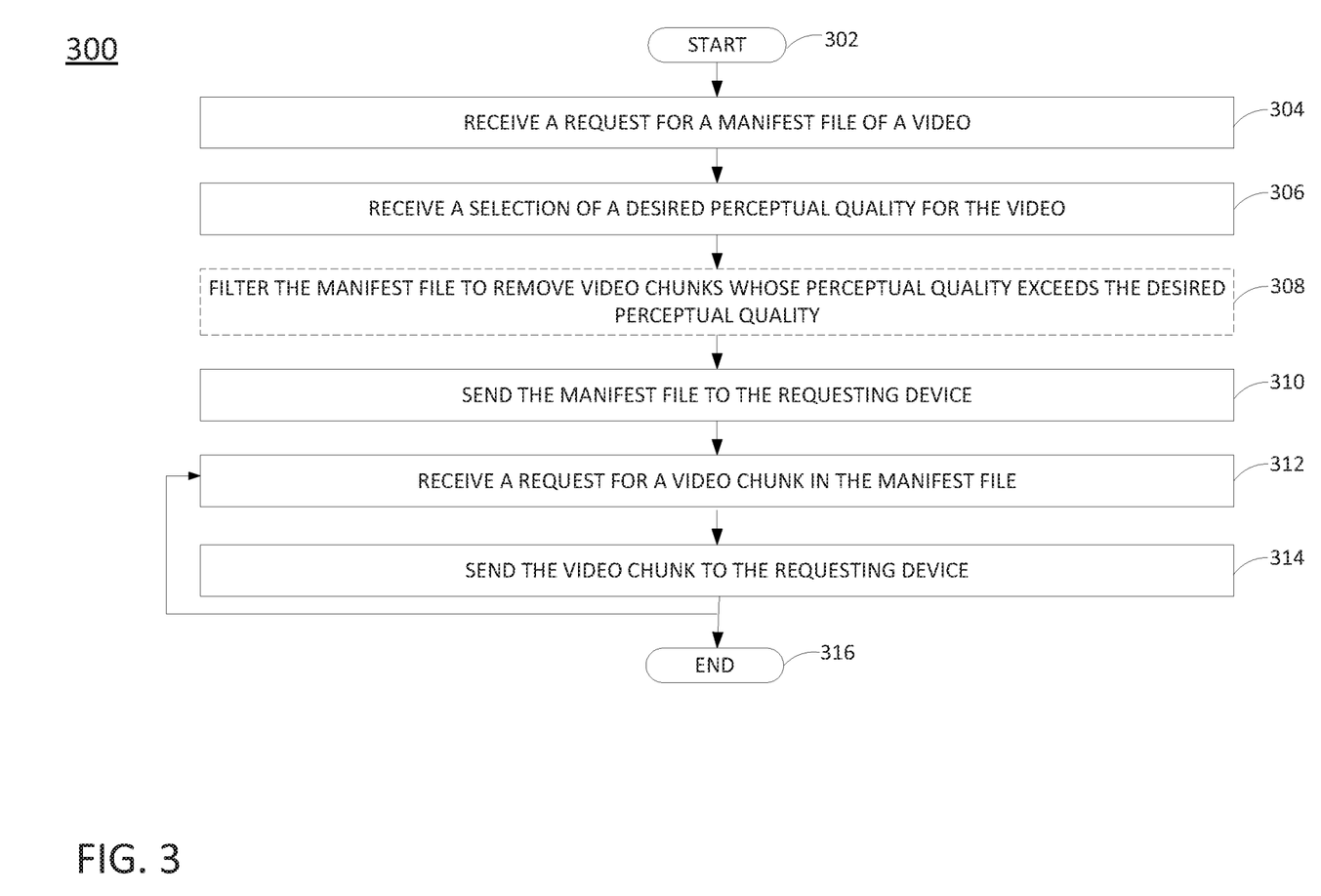
FIG. 3 illustrates a flowchart of an example method for transmitting a video chunk selected from among a plurality of video chunks associated with a first time block of a video in accordance with a desired perceptual quality.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

Network 100 may also include a content distribution network (CDN) 170. In one example, CDN 170 may be operated by a different entity from the core network 110. In another example, CDN 170 may be operated by the same entity as the core network 110, e.g., a telecommunication service provider. In one example, the CDN 170 may comprise a collection of cache servers distributed across a large geographical area and organized in a tier structure. The first tier may comprise a group of servers that accesses content web servers (e.g., origin servers) to pull content into the CDN 170, referred to as an ingestion servers, e.g., ingest server 172. The content may include videos, content of various webpages, electronic documents, video games, etc. A last tier may comprise cache servers which deliver content to end user, referred to as edge caches, or edge servers, e.g., edge server 174. For ease of illustration, a single ingest server 172 and a single edge server 174 are shown in FIG. 1. In between the ingest server 172 and edge server 174, there may be several layers of servers (omitted from the illustrations), referred to as the middle tier. In one example, the edge server 174 may be multi-tenant, serving multiple content providers, such as core network 110, content providers associated with server(s) 149 in other network(s) 140, and so forth. In one example, edge server 174 may comprise an adaptive bitrate streaming video server. In addition, in one example, ingest server 172 and/or edge server 174 may comprise all or a portion of a computing device or system, such as computing system 400, and/or processing system 402 as described in connection with FIG. 4 below, specifically configured to perform various steps, functions, and/or operations in connection with selecting a video chunk from among a plurality of video chunks associated with a first time block of a video in accordance with a designated perceptual quality.

As mentioned above, TV servers 112 in core network 110 may also include one or more interactive TV/video-on-demand (VoD) servers and/or network-based DVR servers. In one example, an interactive TV/VoD server and/or DVR server may comprise all or a portion of a computing device or system, such as computing system 400, and/or processing system 402 as described in connection with FIG. 4 below, specifically configured to perform various steps, functions, and/or operations in connection with selecting a video chunk from among a plurality of video chunks associated with a first time block of a video in accordance with a designated perceptual quality, as described herein. Among other things, an interactive TV/VoD server and/or network-based DVR server may function as a server for STB/DVR 162A and/or STB/DVR 162B, one or more of mobile devices 157A, 157B, 167A and 167B, and/or PC 166 operating as a client/streaming-configured video player for requesting and receiving a manifest file for a multi-encoded video, as described herein. For example, STB/DVR 162A may present a user interface and receive one or more inputs (e.g., via remote control 168A) for a selection of a video. STB/DVR 162A may request the video from an interactive TV/VoD server and/or network-based DVR server, which may retrieve the manifest file for the video from one or more of application servers 114 and provide the manifest file to STB/DVR 162A. STB/DVR 162A may then obtain video chunks of the video as identified in the manifest file and in accordance with streaming logic (e.g., as described in connection with the method 200 of FIG. 2, and as described elsewhere herein). In one example, one or more of application servers 114 and/or STB/DVR 162A may also assemble the manifest file or generate a client-specific manifest file that accounts for the user-selected desired perceptual quality. For instance, any one or more of application servers 114 and/or STB/DVR 162A may comprise a processing system that implements chunk-based filtering (CBF), e.g., wherein the manifest file provided to a client device omits any chunks that exceed the user-selected perceptual quality.

In one example, the manifest file may direct the STB/DVR 162A to obtain the video chunks from edge server 174 in CDN 170. The edge server 174 may already store the video chunks of the video and may deliver the video chunks upon a request from the STB/DVR 162A. However, if the edge server 174 does not already store the video chunks, upon request from the STB/DVR 162A, the edge server 174 may in turn request the video chunks from an origin server. The origin server which stores chunks of the video may comprise, for example, one of the servers 149 or one of the TV servers 112. The chunks of the video may be obtained from the origin server via ingest server 172 before passing to edge server 174. In one example, the ingest server 172 may also pass the video chunks to other middle tier servers and/or other edge servers (not shown) of CDN 170. The edge server 174 may then deliver the video chunks to the STB/DVR 162A and may store the video chunks until the video chunks are removed or overwritten from the edge server 174 according to any number of criteria, such as a least recently used (LRU) algorithm for determining which content to keep in the edge server 174 and which content to delete and/or overwrite.

It should be noted that a similar process may involve other devices, such as TV 163A or TV 163B (e.g., "smart" TVs), mobile devices 176A, 167B, 157A or 157B obtaining a manifest file for a video from one of the TV servers 112, from one of the servers 149, etc., and requesting and obtaining video chunks of the video from edge server 174 of CDN 170. In this regard, it should be noted that edge server 174 may comprise a server that is closest to the requesting device geographically or in terms of network latency, throughput, etc., or which may have more spare capacity to serve the requesting device as compared to other edge servers, which may otherwise best serve the video to the requesting device, etc. However, depending upon the location of the requesting device, the access network utilized by the requesting device, and other factors, the chunks of the video may be delivered via various networks, various links, and/or various intermediate devices. For instance, in one example, edge server 174 may deliver video chunks to a requesting device in home network 160 via access network 120, e.g., an ISP network. In another example, edge server 174 may deliver video chunks to a requesting device in home network 160 via core network 110 and access network 120. In still another example, edge server 174 may deliver video chunks to a requesting device such as mobile device 157A or 157B via core network 110 and wireless access network 150.

It should also be noted that in accordance with the present disclosure, any one or more devices of system 100 may perform operations for generating different video chunks/bitrate variants for time blocks of a video and/or for generating different tracks of a video (e.g., ABR encoders or the like), for determining and tagging video chunks with perceptual qualities, for generating a manifest file for the video (which in some examples may also include chunk-based filtering (CBF), and so on, such as one or more of application servers 114, TV servers 112, ingest server 172, edge server 174, one or more of servers 149, and so forth. For instance, any one or more of such devices may comprise a processing system to create, store, and/or stream video chunks for variants of ABR videos (or non-ABR multi-encoded videos), as well as to perform other functions.

Further details regarding the functions that may be implemented by application servers 114, TV servers 112, ingest server 172, servers 149, STBs/DVRs 162A and 162B, TV 163A, TV 163B, mobile devices 157A, 157B, 167A and 167B, and/or PC 166 are discussed in greater detail below in connection with the example of FIG. 2. In addition, it should be noted that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

FIG. 2 illustrates a flowchart of a method 200 for selecting a video chunk from among a plurality of video chunks associated with a first time block of a video in accordance with a desired perceptual quality, in accordance with the present disclosure. In one example, the method 200 is performed by a video player/client device, e.g., STB/DVR 162A, STB/DVR 162B, one of the TVs 163A or 163B, PC 166, one of the mobile devices 157A, 157B, 167A, or 167B, and so forth, or any one or more components thereof, such as a processing system, or by one of these devices in conjunction with other devices and/or components of network 100 of FIG. 1. In one example, the steps, functions, or operations of method 200 may be performed by a computing device or system 400, and/or a processing system 402 as described in connection with FIG. 4 below. For instance, the computing device 400 may represent any one or more components of a client device that is/are configured to perform the steps, functions and/or operations of the method 200. For illustrative purposes, the method 200 is described in greater detail below in connection with an example performed by a processing system, such as processing system 402.

The method 200 begins in step 202 and proceeds to step 204. In step 204, the processing system may obtain a selection of a video for streaming. For instance, the processing system may comprise an endpoint device/client device, e.g., a mobile phone, tablet, laptop computer, desktop computer, set-top-box, smart TV, etc. (or at least a portion thereof) that interacts with a streaming video server and that provides a user interface which may present various videos available for streaming (e.g., via a display screen). The user interface may also provide for receiving user selection(s) of video(s) and playing-out video chunks of the video(s) that are obtained by the client device, receiving and executing commands to pause, rewind, and fast forward, and so forth.

In step 206, the processing system may obtain a selection of a desired perceptual quality for the video. For instance, the processing system (e.g., of an endpoint/client device comprising a streaming video player) may obtain a user input via a user interface of a video player application providing for the selection of the desired perceptual quality. In one example, the user interface may give options of "low," "medium," and "high," may provide a numerical scale (e.g., one through ten), or may provide a slider bar, a dial, or the like, where the processing system may map the user input to the desired perceptual quality (for instance, the user interface may not present the actual perceptual quality scale to the user). As discussed above, the perceptual quality is a measure of the visual quality of the video as perceived by the human eye.

At step 208, the processing system may obtain a manifest file of the video. For example, the processing system may request and receive the manifest file of the video from a video server associated with a streaming video service. The manifest file may identify a plurality of video chunks associated with a first time block of the video (in addition to video chunks associated with various other time blocks of the video, e.g., all of the time blocks of the video). Each video chunk of the plurality of video chunks may represent the same visual information of the first time block of the video. In one example, each of the plurality of video chunks is associated with a different track of a plurality of tracks of the video program according to an adaptive bitrate (ABR) streaming protocol. For instance, each track of the plurality of tracks may be encoded at a different encoding bitrate. In other words, all of the video chunks of the same track are encoded at the same nominal/target encoding bitrate. It should be noted that each video chunk of the plurality of video chunks associated with the first time block of the video may be encoded at a different encoding bitrate. In one example, these video chunks may be uniquely associated with different tracks and hence different encoding bitrates. However, in another example, the plurality of video chunks may be encoded at different encoding bitrates, but may not necessarily be associated with "tracks" per se.

The manifest file may also identify perceptual qualities of the plurality of video chunks associated with the first time block of the video, as well as data volumes of the plurality of video chunks associated with the first time block of the video. In one example, the desired perceptual quality and the perceptual qualities of the plurality of chunks are defined in accordance with at least one of a peak signal-to-noise ratio (PSNR) metric, a video multi-method assessment fusion (VMAF), or a structural similarity (SSIM) index. It should be noted that a perceptual quality indication for a video chunk does not change the encoding bitrate of the video chunk; i.e., although the perceptual quality may be influenced to some extent by encoding bitrate, encoding bitrate is not affected by perceptual quality.

The manifest file may also identify for each video chunk: a URL or other indicator of where and/or how the client/video player may obtain the video chunk, the playback duration of the chunk, and so forth. In one example, step 208 is performed in response to the selection(s) obtained in step 202 and/or step 204. It should also be noted that the term "first" does not necessarily denote that the first time block is a beginning time block a video, although in one example it may be so.

In optional step 210 (illustrated in phantom), the processing system may filter the manifest file to remove any video chunks having a perceptual quality that exceeds the desired perceptual quality as obtained in step 206. By removing the video chunks whose perceptual qualities exceed the desired perceptual quality, it may be ensured that the processing system does not consume more data than is necessary on downloading video chunks having a greater perceptual quality than is needed (even if those chunks are part of a track from which other chunks have been downloaded). Step 210 may be optional because, in some examples, the filtering may be performed prior to the manifest file being obtained by the processing system (e.g., by the video server), as discussed below in connection with FIG. 3.

In some examples, step 210 may further involve filtering the manifest file based on bitrate. For instance, the video player/client may be set (e.g., by the user) to limit the bitrate of the video that can be downloaded. As an example, a video streaming service may offer a track-based filtering (TBF) feature which allows a user to select from among a "data saver" option (e.g., which downloads chunks from tracks that are encoded at no more than a first encoding bitrate, say 120 kbps), a "good" option (e.g., which downloads chunks from tracks that are encoded at no more than a second encoding bitrate, say 450 kbps), a "better" option (e.g., which downloads chunks from tracks that are encoded at no more than a third encoding bitrate, say 650 kbps), and a "best" option (e.g., which downloads chunks from tracks that are encoded at no more than a fourth encoding bitrate, say 1000 kbps). By selecting one of these options, the user is defining a maximum permitted bitrate that the video player/client can download. For instance, if the user selects the "better" option, then the video player/client cannot download video chunks from tracks having encoding bitrates that exceed the third encoding bitrate. Where a user has limited the bitrate of the video that can be downloaded via TBF or a similar mechanism, the manifest file may be further filtered in step 210 such that any video chunks exceeding the maximum permitted bitrate are removed from the manifest file.

Filtering of the manifest file (based on chunk perceptual quality and/or bitrate) may result in a reduced plurality of chunks being associated with the first time block of the video (i.e., a subset of the plurality of chunks that was contained in the manifest file obtained in step 208).

In step 212, the processing system may select a first video chunk from among the plurality of video chunks (or the reduced plurality of chunks, if filtering in accordance with step 210 was performed) associated with a first time block of the video, based upon a manifest file of the video. For instance, the manifest file of the video may be obtained in step 208 as discussed above. In one example, the selection of the first video chunk is made in accordance with the desired perceptual quality obtained at step 206. For example, each video chunk of the plurality of video chunks may be associated with a respective perceptual quality. In addition, in one example, the perceptual qualities for each video chunk may be indicated in the manifest file as discussed above.

In one example, step 212 may comprise selecting the first video chunk from among the plurality of video chunks that has a least difference between the desired perceptual quality and a perceptual quality of the first video chunk. In another example, step 212 may comprise first identifying a subset of the plurality of video chunks, where the subset includes those video chunks of the plurality of video chunks whose perceptual quality is within some threshold tolerance of the desired perceptual quality (where the threshold tolerance may be user-defined). Then, from among the subset, the video chunk that is from the lowest track (e.g., encoded at the lowest encoding bitrate) is selected. Thus, the desired perceptual quality can be maintained while minimizing the amount of data that is consumed.

At step 214, the processing system may obtain the first video chunk from a server (e.g., via one or more links over one or more networks). For instance, in one example, the processing system may request the first video chunk in accordance with a URL or other identifiers of the first video chunk from a manifest file or the like for the video. In one example, the first video chunk may be requested from a same source as other video chunks of the video (e.g., for different time blocks preceding or following the first time block). In another example, the first video chunk may be stored on another device or system from which the processing system may request the first video chunk. The first video chunk may be sent by the server to the processing system (e.g., to the client device/video player) via the same or different network links over which the request may be submitted.

At step 216, the processing system may store the first video chunk in a buffer (e.g., a video buffer of the client device/video player). For example, the video buffer may comprise a portion of a memory of a device of the processing system or may be otherwise associated with the processing system. The first video chunk and/or portions thereof (e.g., groups of one or more frames) may be recorded in the video buffer in the order received, or may be reordered in an order for presentation/playback. For instance, each video chunk may be tagged with a time block indicator, and/or frames thereof may be tagged with frame numbers indicating each frame's order or position within a sequence of frames, e.g., within the video chunk or time block, and/or within the overall video.

Following step 216, if there are any additional time blocks of the video for which a video chunk is to be selected, obtained, etc. (e.g., a second time block, which may or may not follow the first time block in order of video presentation), the method 200 may return to step 212. For example, the obtaining and storing of the video chunk at steps 214 and 216 may be performed at a time prior to when the processing system is ready to play the first video chunk. Therefore, the method 200 may include selecting, obtaining, and storing one or more additional video chunks (e.g., second and subsequent video chunks, for second and subsequent time blocks) prior to the actual presentation of the first video chunk of the first time block via a display. Otherwise, the method 200 may proceed to step 218.

It should be noted that since the perceptual quality may vary within a single track, and that since multiple chunks from multiple different tracks may match the desired perceptual quality for a given time block of a video, that the additional video chunks that may be selected, obtained, and stored may not come from the same track as the video chunk that is selected, obtained, and stored for the first time block. For instance, a first video chunk that is selected, obtained, and stored for the first time block may come from a first track that is encoded at a first encoding bitrate. However, a second video chunk that is selected, obtained, and stored for a second time block of the same video (where the second time block may be, but is not necessarily, immediately subsequent to the first time block) may come from a second track, different from the first track. The second tracking may be encoded at a second encoding bitrate that is different from the first encoding bitrate.

In step 218, the processing system may retrieve the video chunk from the buffer. For example, the obtaining and storing of the video chunk at steps 214 and 216 may be performed at a time prior to when the processing system is ready to play the video chunk. Thus, the video chunk may be temporarily stored in the buffer until the presentation of the video reaches the first time block. In one example, step 218 may include rendering the video chunk for display. For instance, if the video chunk comprises frames that are interframe encoded, the processing system may apply a decoder logic to render the frames in a format that is ready for presentation via a display.

In step 220, the processing system may present the video chunk via a display. For example, the processing system may route decoded frames of the video chunk to a display which may present the frames to a user. In one example, the display may be part of the processing system. In another example, the display may comprise a unique component and/or may be part of a different device.

Following step 220, if there are any additional time blocks of the video for which a video chunk is to be selected, obtained, stored, played, etc., the method 200 may return to step 212. Otherwise, the method 200 may end in step 222.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200, such as for additional time blocks of the video or for a different video, or in response to a command to change the desired perceptual quality. For instance, upon pausing the presentation/display of the video, a user may be provided with an option to change the desired perceptual quality. Thus, these and other modifications are all contemplated within the scope of the present disclosure.

FIG. 3 illustrates a flowchart of an example method 300 for transmitting a video chunk selected from among a plurality of video chunks associated with a first time block of a video in accordance with a desired perceptual quality. In one example, the method 300 is performed by a server or network element, e.g., application servers 114, TV servers 112, NEs 111, servers 149, and so forth, or any one or more components thereof, such as a processing system, or by one of these devices in conjunction with other devices and/or components of network 100 of FIG. 1. In one example, the steps, functions, or operations of method 300 may be performed by a computing device or system 400, and/or a processing system 402 as described in connection with FIG. 4 below. For instance, the computing device 400 may represent any one or more components of a client device that is/are configured to perform the steps, functions and/or operations of the method 300. For illustrative purposes, the method 300 is described in greater detail below in connection with an example performed by a processing system, such as processing system 402.

The method 300 begins in step 302 and proceeds to step 304. In step 304, the processing system may receive a request (e.g., from a video player/client device) for a manifest file of a video. For example, the processing system may be part of a video server associated with a streaming video service. The manifest file may identify a plurality of video chunks associated with a first time block of the video (in addition to video chunks associated with various other time blocks of the video, e.g., all of the time blocks of the video). Each video chunk of the plurality of video chunks may represent the same visual information of the first time block of the video. In one example, each of the plurality of video chunks is associated with a different track of a plurality of tracks of the video program according to an adaptive bitrate (ABR) streaming protocol. For instance, each track of the plurality of tracks may be encoded at a different encoding bitrate. In other words, all of the video chunks of the same track are encoded at the same nominal/target encoding bitrate. It should be noted that each video chunk of the plurality of video chunks associated with the first time block of the video may be encoded at a different encoding bitrate. In one example, these video chunks may be uniquely associated with different tracks and hence different encoding bitrates. However, in another example, the plurality of video chunks may be encoded at different encoding bitrates, but may not necessarily be associated with "tracks" per se.

The manifest file may also identify perceptual qualities of the plurality of video chunks associated with the first time block of the video, as well as data volumes of the plurality of video chunks associated with the first time block of the video. In one example, the perceptual qualities of the plurality of chunks are defined in accordance with at least one of a peak signal-to-noise ratio (PSNR) metric, a video multi-method assessment fusion (VMAF), or a structural similarity (SSIM) index. It should be noted that a perceptual quality indication for a video chunk does not change the encoding bitrate of the video chunk; i.e., although the perceptual quality may be influenced to some extent by encoding bitrate, encoding bitrate is not affected by perceptual quality.

The manifest file may also identify for each video chunk: a URL or other indicator of where and/or how the client/video player may obtain the video chunk, the playback duration of the chunk, and so forth. It should be noted that the term "first" does not necessarily denote that the first time block is a beginning time block a video, although in one example it may be so.

In optional step 306 (illustrated in phantom), the processing system may receive (e.g., from the video player/client device) a selection of a desired perceptual quality for the video. In one example, the perceptual quality may be defined on a scale such as "low," "medium," and "high," on a numerical scale (e.g., one through ten), or as a value on a slider bar, a dial, or the like, where each value on the scale may be mapped to the desired perceptual quality. As discussed above, the perceptual quality is a measure of the visual quality of the video as perceived by the human eye.

In one example, the selection of desired perceptual quality may be accompanied by a selection of a maximum bitrate. For instance, the video player/client may be set (e.g., by the user) to limit the bitrate of the video that can be downloaded. As an example, a video streaming service may offer a TBF feature which allows a user to select from among a "data saver" option (e.g., which downloads chunks from tracks that are encoded at no more than a first encoding bitrate, say 120 kbps), a "good" option (e.g., which downloads chunks from tracks that are encoded at no more than a second encoding bitrate, say 450 kbps), a "better" option (e.g., which downloads chunks from tracks that are encoded at no more than a third encoding bitrate, say 650 kbps), and a "best" option (e.g., which downloads chunks from tracks that are encoded at no more than a fourth encoding bitrate, say 1000 kbps). By selecting one of these options, the user is defining a maximum permitted bitrate that the video player/client can download. For instance, if the user selects the "better" option, then the video player/client cannot download video chunks from tracks having encoding bitrates that exceed the third encoding bitrate.

In optional step 308 (illustrated in phantom), the processing system may filter the manifest file to remove any video chunks having a perceptual quality that exceeds the desired perceptual quality as obtained in step 306. By removing the video chunks whose perceptual qualities exceed the desired perceptual quality, it may be ensured that the requesting device does not consume more data than is necessary on downloading video chunks having a greater perceptual quality than is needed (even if those chunks are part of a track from which other chunks have been downloaded). In one example, removing the video chunks from the manifest file may involve removing the video chunks outright, i.e., so that the manifest file contains no information for any variants corresponding to the removed video chunks (e.g., according to the chunk variant trimming approach discussed above). In this case, it may be apparent to the video player/client device that the manifest file has been altered, as it will appear that some variants (or information for some variants) are missing from the manifest file. In another example, the video chunks that are removed may be replaced with video chunks whose perceptual quality does not exceed the desired perceptual quality (e.g., according to the chunk variant substitution approach discussed above). In this case, it may be less apparent to the video player/client device that the manifest file has been altered, since no variants will appear to be missing (the information for some variants will simply be changed). Step 308 may be optional because, in some examples, the filtering may be performed by the requesting device, as discussed above in connection with FIG. 2.

In some examples, step 308 may further involve filtering the manifest file based on bitrate. For instance, where a user has limited the bitrate of the video that can be downloaded via TBF or a similar mechanism, the manifest file may be further filtered in step 308 such that any video chunks exceeding the maximum permitted bitrate are removed from the manifest file.

Filtering of the manifest file (based on chunk perceptual quality and/or bitrate) may result in a reduced plurality of chunks being associated with the first time block of the video (i.e., a subset of the plurality of chunks that was originally contained in the manifest file). This may simplify the later selection of video chunks by the video player/client device side (as discussed above) without requiring any change to the video player/client device logic (e.g., the video player/client device does not need to have an awareness or understanding of perceptual quality).

In step 310, the processing system may send the manifest file to the requesting device. As discussed above, the manifest file that is sent in step 310 may have been filtered in accordance with step 308.

In step 312, the processing system may receive a request for a video chunk that was contained in the manifest file (e.g., a video chunk selected from the plurality, or reduced plurality, of video chunks). For instance, in one example, the request may identify a URL or other identifiers of the video chunk from the manifest file or the like for the video. In one example, the video chunk may be requested by a same source as other video chunks of the video (e.g., for different time blocks preceding or following the first time block). In one example, the perceptual quality of the video chunk may not exceed the desired perceptual quality selected in step 306, and the encoding bitrate of the video chunk may not exceed the maximum bitrate selected in step 306.

In step 314, the processing system may send the video chunk requested in step 312 to the requesting device. The video chunk may be sent to the requesting device via the same or different network links over which the request was received in step 312.

Following step 314, if there are any additional time blocks of the video for which a video chunk is to be selected, obtained, etc., the method 300 may return to step 312. For example, the receiving and sending of the request and video chunk at steps 312 and 314 may be performed repeatedly by the requesting device as the requesting device plays different time blocks of the video. Therefore, the method 300 may include receiving and sending one or more additional requests and video chunks (e.g., for subsequent time blocks). Otherwise, the method 300 may proceed to step 316.

Although not expressly specified above, one or more steps of the method 200 or method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 or method 300 may comprise optional steps, or can be combined, separated, and/or performed in a different order from that described above, without departing from the example embodiments of the present disclosure. The method 200 or method 300 may also be expanded to include additional steps. Thus, these and other modifications are all contemplated within the scope of the present disclosure.

Figure 4:
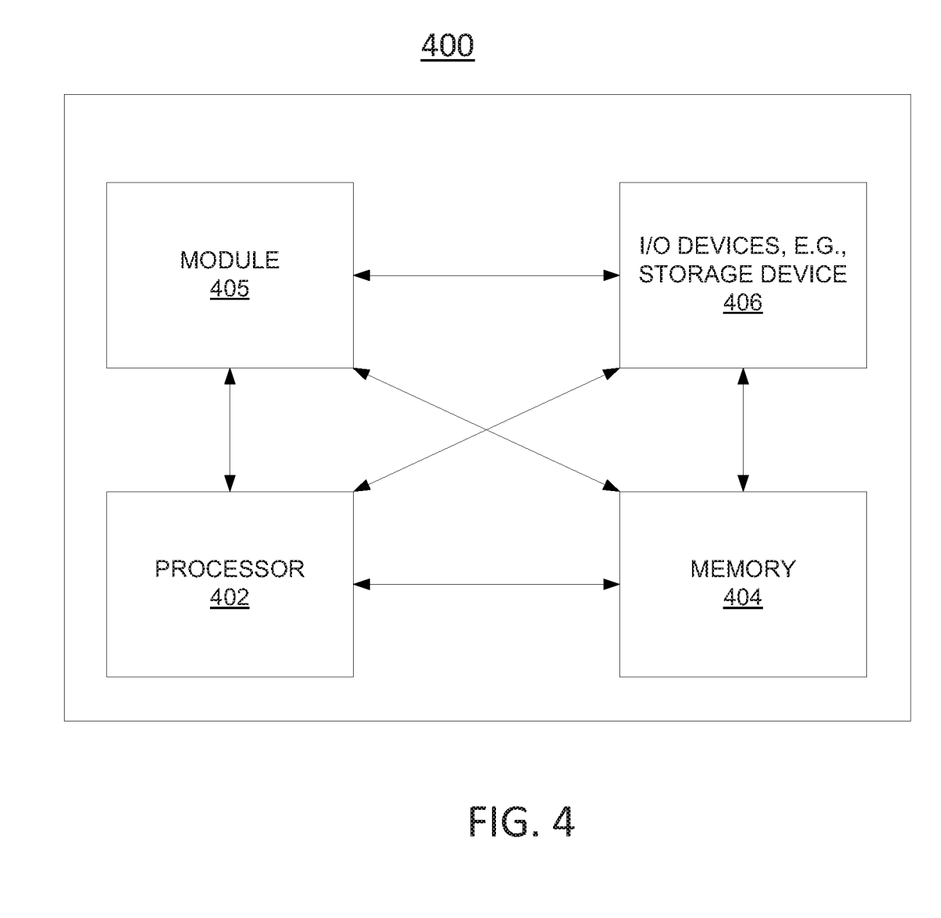
FIG. 4 illustrates a high level block diagram of a computing device or system specifically programmed to perform the steps, functions, blocks and/or operations described herein.

FIG. 4 depicts a high-level block diagram of a computing device or processing system specifically programmed to perform the functions described herein. For example, any one or more components or devices illustrated in FIG. 1 or described in connection with the method 200 or method 300 may be implemented as the system 400. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for selecting a video chunk from among a plurality of video chunks associated with a first time block of a video in accordance with a desired perceptual quality, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 406 may also include antenna elements, transceivers, power units, and so forth. Although only one processor element is shown, it should be noted that the computing device may employ a plurality of processor elements. Furthermore, although only one computing device is shown in the figure, if the method 200 or method 300 as discussed above is implemented in a distributed or parallel manner for a particular illustrative example, i.e., the steps of the above method 200 or method 300, or the entire method 200 or method 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200 or method 300. In one example, instructions and data for the present module or process 405 for selecting a video chunk from among a plurality of video chunks associated with a first time block of a video in accordance with a desired perceptual quality (e.g., a software program comprising computer-executable instructions) can be loaded into memory 404 and executed by hardware processor element 402 to implement the steps, functions, or operations as discussed above in connection with the illustrative method 200 or method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for selecting a video chunk from among a plurality of video chunks associated with a first time block of a video in accordance with a desired perceptual quality (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:

obtaining, by a processing system including at least one processor, a user selection of a desired perceptual visual quality for a video;

obtaining, by the processing system, a manifest file of the video;

selecting, by the processing system, a first video chunk from among a first plurality of video chunks, wherein the first plurality of video chunks is associated with a first time block of the video, wherein the selecting comprises:

identifying, by the processing system, a subset of the first plurality of video chunks for which a respective perceptual visual quality matches the desired perceptual visual quality within a predefined threshold tolerance, wherein the manifest file indicates the respective perceptual visual quality for each video chunk of the first plurality of video chunks; and identifying, by the processing system subsequent to the identifying the subset, the first video chunk as a video chunk from the subset for which a respective encoding bitrate is lowest among all video chunks in the subset, wherein the manifest file indicates the respective encoding bitrate for each chunk of the first plurality of video chunks;

wherein the manifest file has been filtered, prior to being obtained by the processing system, to remove any video chunks whose respective perceptual visual quality is higher than the desired perceptual visual quality and any video chunks whose respective encoding bitrate is higher than a predefined maximum encoding bitrate;

obtaining, by the processing system, the first video chunk from a server of a streaming video service; and storing, by the processing system, the first video chunk in a buffer.

2. The method of claim 1, wherein the desired perceptual visual quality and the respective perceptual visual quality are measures of a visual quality as perceived by a human eye.

3. The method of claim 1, wherein the desired perceptual visual quality is defined as a user selection on a scale of user selections.

4. The method of claim 1, wherein the desired perceptual visual quality and the respective perceptual visual quality are defined in accordance with a peak signal-to-noise ratio metric.

5. The method of claim 1, wherein the desired perceptual visual quality and the respective perceptual visual quality are defined in accordance with a video multi-method assessment fusion metric.

6. The method of claim 1, wherein the desired perceptual visual quality and the respective perceptual visual quality are defined in accordance with a structural similarity index.

7. The method of claim 1, wherein the predefined maximum encoding bitrate is defined by a user from whom the user selection of the desired perceptual video quality is obtained.

8. The method of claim 1, wherein the manifest file is filtered by a remote server that communicates with the processing system over a network.

9. The method of claim 1, further comprising:

selecting, by the processing system, a second video chunk from among a second plurality of video chunks, wherein the second plurality of video chunks is associated with a second time block of the video, wherein the selecting comprises:

identifying, by the processing system, a subset of the second plurality of video chunks for which a respective perceptual visual quality matches the desired perceptual visual quality within the predefined threshold tolerance, wherein the manifest file indicates the respective perceptual visual quality for each video chunk of the second plurality of video chunks; and identifying, by the processing system subsequent to the identifying the subset of the second plurality of video chunks, the second video chunk as a video chunk from the subset of the second plurality of video chunks for which a respective encoding bitrate is lowest among all video chunks in the subset of the second plurality of video chunks, wherein the manifest file indicates the respective encoding bitrate for each chunk of the second plurality of video chunks, and wherein the respective encoding bitrate of the second video chunk is different from the respective encoding bitrate of the first video chunk;

obtaining, by the processing system, the second video chunk from the server; and storing, by the processing system, the second video chunk in the buffer.

10. The method of claim 1, further comprising:

retrieving, by the processing system, the first video chunk from the buffer; and presenting, by the processing system, the first video chunk for display.

11. The method of claim 1, wherein the processing system is part of a video player.

12. A device comprising:
a processing system including at least one processor; and
a non-transitory computer-readable medium storing instructions which, when executed by the processing system, cause the processing system to perform operations, the operations comprising:
 obtaining a user selection of a desired perceptual visual quality for a video;
 obtaining a manifest file of the video;
 selecting a first video chunk from among a first plurality of video chunks, wherein the first plurality of video chunks is associated with a first time block of the video, wherein the selecting comprises:
  identifying a subset of the first plurality of video chunks for which a respective perceptual visual quality matches the desired perceptual visual quality within a predefined threshold tolerance, wherein the manifest file indicates the respective perceptual visual quality for each video chunk of the first plurality of video chunks; and
  identifying, by the processing system subsequent to the identifying the subset, the first video chunk as a video chunk from the subset for which a respective encoding bitrate is lowest among all video chunks in the subset, wherein the manifest file indicates the respective encoding bitrate for each chunk of the first plurality of video chunks;
  wherein the manifest file has been filtered, prior to being obtained by the processing system, to remove any video chunks whose respective perceptual visual quality is higher than the desired perceptual visual quality and any video chunks whose respective encoding bitrate is higher than a predefined maximum encoding bitrate;
 obtaining the first video chunk from a server of a streaming video service; and
 storing the first video chunk in a buffer.

13. A method comprising:
obtaining, by a processing system including at least one processor, a user selection of a desired perceptual visual quality for a video;
performing, by the processing system, a first filtering of a manifest file of the video, wherein the manifest file includes information for a plurality of video chunks associated with a first time block of the video, wherein each video chunk of the plurality of video chunks is associated with a respective perceptual visual quality and a respective encoding bitrate, and wherein the first filtering comprises removing from the manifest file information associated with a first subset of the plurality of video chunks for which the respective perceptual visual quality is greater than the desired perceptual visual quality, so that remaining information in the manifest file is associated with a second subset of the plurality of video chunks for which the respective perceptual visual quality is less than or equal to the desired perceptual visual quality;
performing, by the processing system, a second filtering of the manifest file subsequent to the first filtering, wherein the second filtering comprises removing from the manifest file information associated with a third subset of the plurality of video chunks, wherein the third subset comprises video chunks of the second subset for which the respective encoding bitrate is higher than a predefined maximum encoding bitrate; and
sending, by the processing system, the manifest file to a user endpoint device, subsequent to the second filtering.

14. The method of claim 13, further comprising:
subsequent to the second filtering and prior to the sending, replacing, by the processing system, the information associated with the first subset of the plurality of video chunks with information associated with a first video chunk of the plurality of video chunks, wherein the respective perceptual visual quality of the first video chunk matches the desired perceptual visual quality within a predefined threshold tolerance, such that the manifest file after the first filtering and the second filtering lists a number of encoding bitrate variants for the first time block that is equal to a number of encoding bitrate variants for the first time block that is listed in the manifest file before the first filtering.

15. The method of claim 1, wherein information in the manifest file corresponding to the video chunks whose respective perceptual visual quality is higher than the desired perceptual visual quality the video chunks and whose respective encoding bitrate is higher than a predefined maximum encoding bitrate is replaced, prior to being obtained by the processing system, with information for video chunks of the plurality of video chunks that were not removed.

16. The method of claim 1, wherein a second video chunk from the first plurality of video chunks shares the respective encoding bitrate of the first video chunk, but the respective perceptual visual quality of the second video chunk differs from the respective perceptual visual quality of the first video chunk.

17. The method of claim 1, wherein information for the video chunks whose respective perceptual visual quality is higher than the desired perceptual visual quality and the video chunks whose respective encoding bitrate is higher than the predefined maximum encoding bitrate is replaced in the manifest file with information for video chunks of the subset, such that the manifest file after being filtered lists a number of encoding bitrate variants for the first time block that is equal to a number of encoding bitrate variants for the first time block that is listed in the manifest file before being filtered.

18. The method of claim 1, wherein the manifest file is filtered without removing the any video chunks whose respective perceptual visual quality is higher than the desired perceptual visual quality and any video chunks whose respective encoding bitrate is higher than a predefined maximum encoding bitrate from a server which stores the first plurality of video chunks.

19. The method of claim 1, wherein the respective perceptual visual quality of each video chunk of the first plurality of video chunks is stored as metadata that is transmitted in the each video chunk from the server of the streaming video service.

20. The method of claim 1, wherein a second video chunk from the first plurality of video chunks shares the respective perceptual visual quality of the first video chunk, but the respective encoding bitrate of the second video chunk differs from the respective encoding bitrate of the first video chunk.

* * * * *

UNITED STATES PATENT AND TRADEMARK OFFICE
CERTIFICATE OF CORRECTION

| | |
|---|---|
| PATENT NO. | : 11,277,649 B2 |
| APPLICATION NO. | : 16/560721 |
| DATED | : March 15, 2022 |
| INVENTOR(S) | : Subhabrata Sen et al. |

It is certified that error appears in the above-identified patent and that said Letters Patent is hereby corrected as shown below:

On the Title Page

In item (73), "Assignees," delete "AT&T INTELLECTUAL PROPERTY I. L.P." and insert --AT&T INTELLECTUAL PROPERTY I, L.P.--

Signed and Sealed this
Twenty-sixth Day of April, 2022

Katherine Kelly Vidal
*Director of the United States Patent and Trademark Office*